Feb. 24, 1959     W. H. BLASHFIELD     2,875,395
BATTERY CHARGER APPARATUS

Filed Oct. 9, 1953     4 Sheets-Sheet 1

INVENTOR.
WILLIAM H. BLASHFIELD
BY Brown, Jackson,
Boettcher & Drenner
ATTYS.

Feb. 24, 1959 W. H. BLASHFIELD 2,875,395
BATTERY CHARGER APPARATUS
Filed Oct. 9, 1953 4 Sheets-Sheet 2
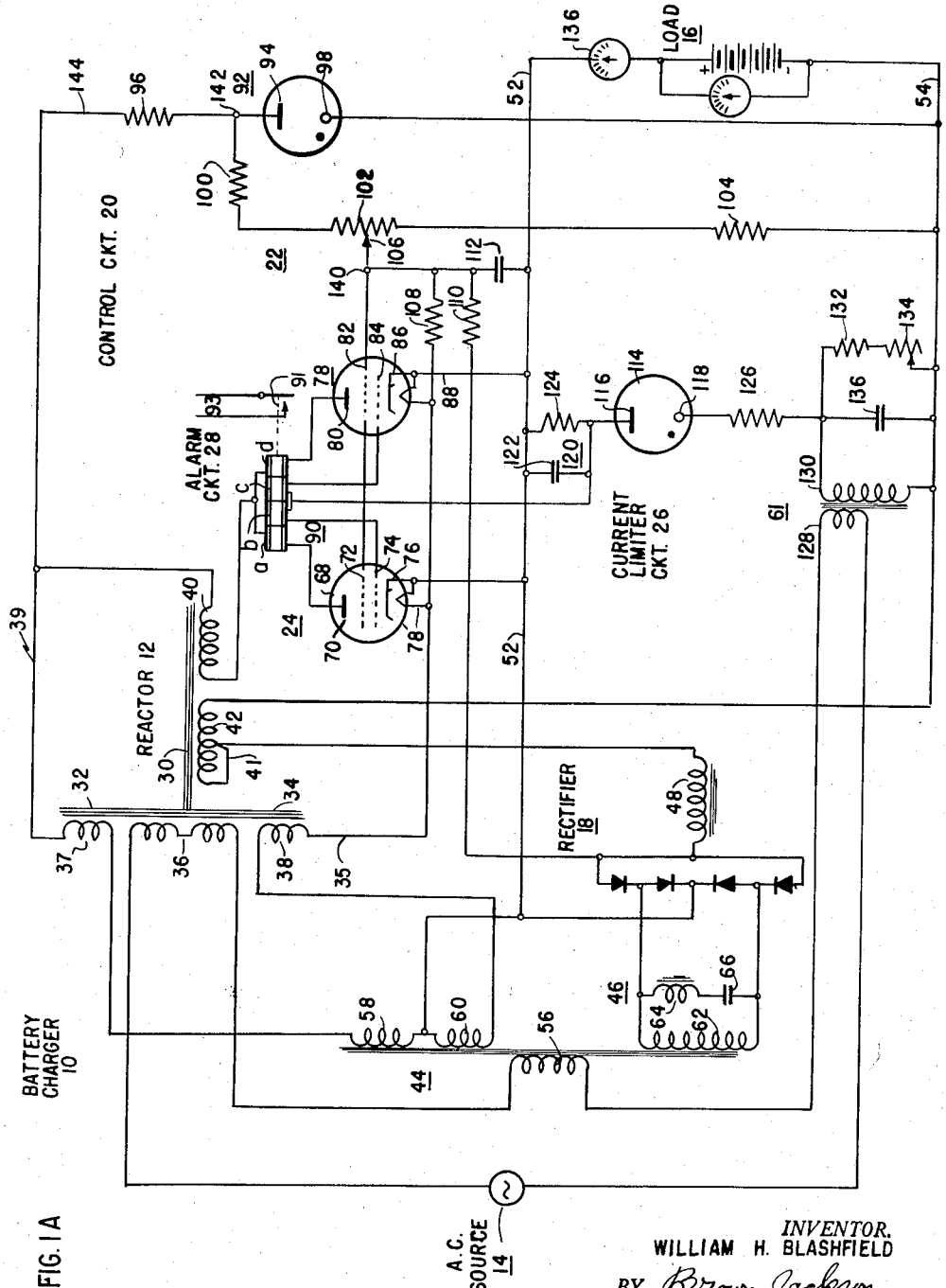
FIG. IA
INVENTOR.
WILLIAM H. BLASHFIELD
BY Brown Jackson
Boettcher Dienner
ATTYS.

Feb. 24, 1959  W. H. BLASHFIELD  2,875,395
BATTERY CHARGER APPARATUS
Filed Oct. 9, 1953  4 Sheets-Sheet 4

INVENTOR.
WILLIAM H. BLASHFIELD
BY Brown, Jackson
Boettcher & Dienner
ATTYS.

United States Patent Office 2,875,395
Patented Feb. 24, 1959

2,875,395

BATTERY CHARGER APPARATUS

William H. Blashfield, Galion, Ohio, assignor to North Electric Company, a corporation of Ohio Application October 9, 1953, Serial No. 385,073

18 Claims. (Cl. 321—19)

The present invention relates to an automatic voltage regulator system, and more particularly to a novel voltage regulator system for use in a novel battery charger unit.

The provision of equipment for providing a constant potential for a variable type load is an age old problem in the electrical field, and with the development of new and more sensitive types of equipment, the problem has become more serious. Voltage variations are inherent in circuits which supply variable type loads; that is, as the load demands an increased amount of current, the value of the voltage tends to decrease a corresponding amount, and as the load current demand decreases, the value of the voltage in the system tends to increase a corresponding amount. The fluctuating voltage, of course, provides serious problems in the use of many types of electrical equipment.

Various arrangements have been developed heretofore in an attempt to minimize the seriousness of this inherent effect in electrical circuits. One of the more conventional methods comprises the use of a saturable reactor unit which responds to changes in the current demands of the load to introduce a reactive voltage component in the circuit in such amounts as to maintain the voltage supplied to the load at a substantially constant value. Whereas the use of this apparatus is of some aid in the provision of a constant voltage supply, minor voltage variations may occur without detection, and the reactor in itself is in many cases insufficient to effect the fine degree of sensitive control which is demanded by certain types of equipment.

Illustrative of the problem encountered in the commercial field are the variable conditions encountered in the automatic charging of a storage battery in a service installation, such as in a telephone battery exchange. Peak load conditions for a number of different hours of the day, for example, followed by slack periods impose varied demand loads upon the storage battery equipment, which tends to shorten the equipment life. Commercial users of telephone battery charger units, have long been aware of this problem, and it is not unusual for field specifications to require that the charger output shall vary less than 1% with 10% variation of the alternating current supply source voltage. Automatic voltage regulator equipment used with marine units, welding apparatus and lighting systems have similar problems because of the varied nature of the loads.

It is an object of the present invention to provide an automatic voltage regulator system including a novel control circuit for supplying a constant potential to a variable type load, and particularly to provide a unit of this type which is economical to build and reliable in its operation.

A novel battery charger apparatus which is a step forward in the field has been set forth in my copending application, which was filed by me on February 6, 1947, Serial No. 726,814, and issued on April 13, 1954, having Patent No. 2,675,515, and which was assigned to the assignee of this invention. In that arrangement, an alternate half cycle reference voltage is derived substantially independent of fluctuations of voltage in the alternating current source, and the load voltage is continually compared with this reference voltage. With detection of a variation of the load voltage from the preestablished reference value, the equipment controls a saturable reactor to adjust the voltage to the desired value. The novel advancements in the art set forth therein are included herewith, and the present invention constitutes a further improvement thereover. The improved control achieved in the present arrangement is effected through the introduction of a minimum amount of economical components. Further, the equipment is extremely flexible in nature, and is adapted for use with circuits for supplying loads which may extend over a fairly wide range.

The circuit arrangement of the present invention, for example, includes a novel economical alarm system which guards against the failure of the electronic tubes in the control circuit, whereby danger of damage to the charger equipment is substantially minimized.

The arrangement also includes a novel current limiter stage which acts to prevent undesirable overloads in an expeditious and reliable manner. The limiter is unique in that it permits the connection of several battery charger units in parallel without danger of damage to either of the units, and without requiring additional supervisory units.

In effecting the improved performance of the equipment, there is included a pair of resistance members which are connected in such manner as to reduce the amplitude of hunting of the system, and to increase the frequency of hunting so as to render the hunting process, and the indications thereof on the ammeter, substantially imperceptible. Such hunting is not objectionable from the standpoint of equipment operation, but does tend to produce an adverse psychological reaction.

A further feature of the invention is the manner in which the alternating current source is controlled by the connection of the alternating current power windings of the reactor in series with the primary of the power transformer, whereby the magnetizing current of the transformer obviates the necessity of a separate minimum load shunt across the power transformer secondary. Minimization of possible variations in the control circuit is also provided by including an arrangement for supplying alternating current to the electronic control circuit independent of the power transformer secondary voltage which tends to vary with the load, such improvement being accomplished without introducing further expensive power transformer equipment. A still further feature of the invention is the manner in which the reference voltage supplied for comparison purposes in the determination of the adjustment to be made by the control circuit is made even more constant than in the previous arrangements.

These and other features and advantages of the present invention are set forth hereinafter in the accompanying specification, claims and drawings, in which:

Figure 1a is a schematic illustration of the various components and interconnections of the circuit arrangement; and Figures 2, 3, 4 and 5 are graphic curve illustrations of the performance of the circuitry shown in Figure 1a.

GENERAL DESCRIPTION

Figure 1:
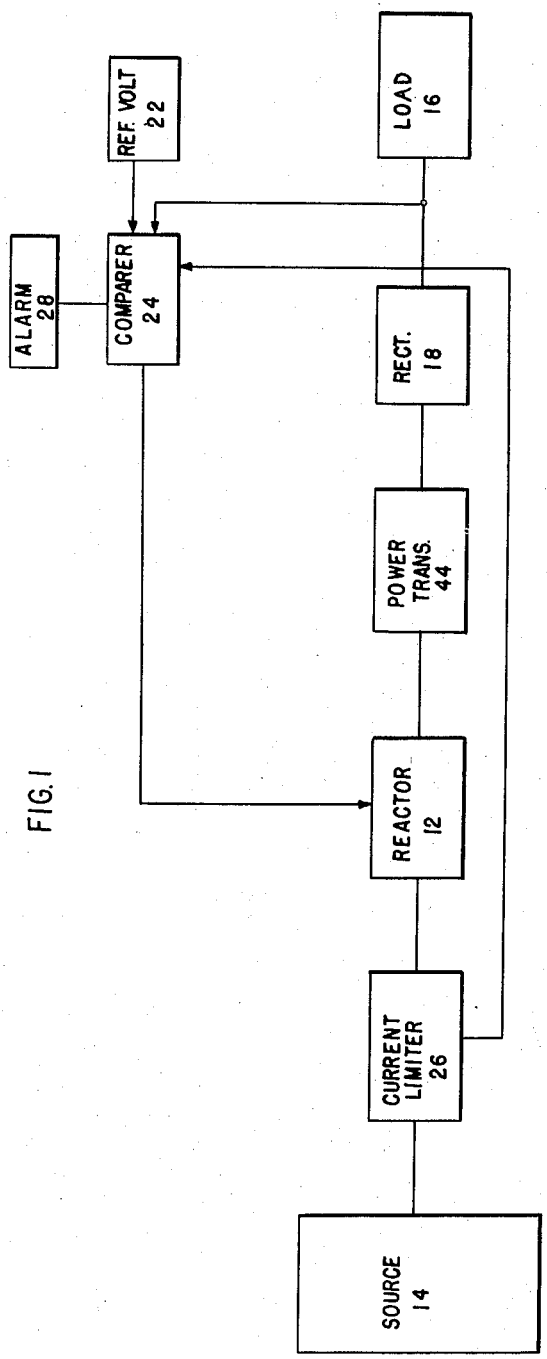
Figure 1 is a schematic showing in block form of the various stages of the control apparatus.

The novel battery charger apparatus 10, as shown in Figure 1, is basically comprised of a saturable reactor unit 12, which is connected over a current limiter device 26 to a power supply source 14 to control the provision of a constant voltage supply for a given load, which is exemplified herein as a battery 16. A power transformer 44 is connected to the reactor output and a rectifier unit 18 is connected to the transformer to convert the output thereof into a D. C. voltage for the load 16.

The reactor unit 12 is, in turn, controlled by a novel electronic control circuit 20 which basically comprises a reference voltage producing section 22 for providing a fixed value, alternating current half cycle voltage signal for reference purposes, and a comparer stage 24 which compares the load voltage with the reference voltage provided by section 22, and adjusts the reactor unit 12 to vary the output of the source to compensate for any variation of the value of the voltage supply to the load from the predetermined value.

The novel current limiter circuit 26 is operative to prevent the supply of greater than rated current to the load 16, whereby suitable protection is provided against equipment damage in the event of excessive demands by a low battery. The current limiter circuit 26 also renders more practical the connection of two or more chargers in parallel to supply a common load.

An alarm circuit 28 operates to inform the attendant of prolonged inoperativeness of section 24 resulting from equipment failure.

Various ones of the aforedescribed stages were included in my copending application, and the advantages of the use of same are set forth in detail therein.

CIRCUIT DESCRIPTION

Reactor unit

The reactor unit 12 which controls the current supply to the rectifier 18 and the load 16, as shown in Figure 1a, is comprised of a core of magnetic material 30 having end legs, such as 32, 34 on which alternating current windings, such as 36, 37 and 38 may be located for connection to the alternating current power source 14. A D. C. control winding 40 located on the middle leg 30 is energized by the control circuit 20 in such manner as to effect an extremely constant potential supply for the load. Winding 41, 42 is connected to the middle leg 30 as an aid to control winding 40, a portion of the winding being shorted to limit the change in flux during periods when no current flows through the control winding 40.

POWER SUPPLY CIRCUIT

The power supply circuit for the arrangement basically comprises a conventional 60 cycle alternating current source 14 arranged to provide an appropriate voltage, such as 110, 220, 440 volts; a power transformer 44, a peak cut-off circuit 46, and a rectifier bridge 18, the output of the bridge being connected over a choke 48, winding 42 of reactor 12, and conductors 52 and 54 to the load 16.

The power transformer 44 in the supply circuit is comprised of a primary winding 56 and three secondary windings 58, 60 and 62. Secondary windings 58 and 60 are connected to supply operating current to the control circuit 20, winding 58 being connected to supply B+ voltage to various tube members of control circuit 20, and winding 60 being connected to provide six volt filament heater current for the various tube members of control circuit 20. The current supply paths for the elements of control circuit 20 are considered in more detail hereinafter.

Secondary winding 62 of power transformer 44 supplies current over rectifier bridge 18 to the load 16. A peak cut-off circuit 46, comprised of a 180 cycle choke coil 64 connected in series with a 15 mf. capacitor 66 is connected across the secondary winding 62 to improve the wave form which is fed into the rectifier bridge 18.

As is well known, a saturable reactor in providing a load voltage creates high peaks in the alternating current wave form, and as a result a larger than normal rectifier is required to counteract the distorted wave form. The peak limiter circuit 46 used herein is of a value chosen to effectively short circuit the third harmonic in the wave which is responsible for the high peak, and thereby permit the use of rectifier units in the bridge 18 which are of smaller values. The choke and capacitor arrangement 64, 66 are also in approximately parallel resonance with the inductance of power transformer 44 at 60 cycles, so that no extra load is added at fundamental frequency. Tuning is broad enough that variations in power supply frequency have negligible effect on performance.

The four rectifier units of bridge 18 which rectify the output of the secondary winding 62 may be of the selenium or copper oxide type.

The output of the rectifier bridge circuit 18 is extended over conductors 52 and 54, conductor 52 being connected directly to the load, and the conductor 54 being connected over the D. C. choke control 48, and the direct current control leg 41, 42, of reactor 12 to conductor 54 and the other side of the load.

Assuming the control winding 40 is not connected in the circuit, as the alternating current supply source 14 is energized, the primary winding 56 of the power transformer 44 and the alternating current winding 36 of the saturable reactor 12 are energized in an obvious manner, and a predetermined value of current is supplied by the source to the load circuit 16. With changes in the load demand, the reactor winding 41, 42 would alter saturation of core 30 in a corresponding manner, and the load voltage would be adjusted toward the desired value. That is, as the load draws an increased amount of current, increased current flow over control winding 42 of reactor 12 to the load increases the saturation of the core of magnetic material in the saturable reactor 12. The increased saturation of the magnetic material produces a lower inductance in the alternating coils 36, 37 and 38, and a corresponding decrease in impedance to the flow of alternating current through the coil 36, the power transformer primary winding 56, and the current transformer primary winding 128. As a result, there is an increased current flow in the energizing circuit for the power transformer 44, and a corresponding increase in current flow over the supply path to the load 16. With an increase in current flow in the power supply circuit, the output voltage across transformer 44 as fed to the load is increased, the increase being of a value to adjust the load voltage toward the desired value.

In a similar manner, with a decrease in the current demand of the load, and the corresponding increase in the value of the load voltage, the decreased current flow effected through control winding 42 effects a decrease in the saturation of the core of the saturable reactor which results in an increased impedance to the flow of current through alternating current coil 36, primary winding 56 of the power transformer 44, and the primary winding of the current transformer to effect a corresponding reduction in current flow to transformer 44, and a reduction of the load voltage toward the desired value.

CONTROL CIRCUIT

Circuit arrangement

Although coil 42, which is in series with the supply circuit for load 16, adjusts the saturation of the reactor core 30 with a changing load, the coil has deliberately been provided a number of turns which is sufficient to account at full charger output for only a fractional part of the saturation of the D. C. reactor core. That is, prior arrangements which rely on the reactor unit to detector variations of a load voltage value, respond too slowly to the variations, and as a result many types of equipment cannot be successfully used therewith. Thus, by minimizing the effect of reactor winding 41, 42, and by introducing a second winding 40, which is controlled by an electronic control circuit 20, a more sensitive type voltage regulator is provided. Further, since the winding 42 is comparatively large, the current output of control circuit 20 required to effect saturation of the reactor 12 is made somewhat small, and the demand upon the control tubes of the electronic circuit is considerably reduced.

As mentioned heretofore, the control circuit is basically operative to provide a fixed, alternate half-cycle reference voltage, to derive a proportional signal from the load voltage, to compare the load voltage with the predetermined standard, and to adjust the flow of current in winding 40 of the reactor an amount sufficient to cause the reactor to compensate for the variation in voltage supply for the load. The control circuit 20 which is thus operative, is basically comprised of a comparer stage illustrated generally at 24, a reference stage 22, and an alarm stage 28.

The comparer stage includes a pair of gas filled tetrodes 68 and 78, each of which has at least an anode 70, 80, a first control electrode 72, 82, a second control electrode 74, 84, an indirectly heated cathode 76, 86, and a filament 78, 88. The anodes 70, 80 of the tubes 68, 78 are connected over the "a" and "d" windings of the multiple winding tube alarm relay 90, and the control winding 40 of the saturable reactor 12 to the supply conductor 39, from whence the B+ voltage for the anodes 70, 80, of tubes 68, 78 is obtained.

The filaments 78 and 88 of tubes 68 and 78 are parallelly connected with each other, and are connected in series with the reactor coil 38 and the power transformer secondary coil 60, whereby a voltage of a constant value is supplied to the tube filaments. That is, if the tube filaments are supplied directly from the secondary of the power transformer 44, the voltage will vary with the load changes. However, by providing reactor 36 and 38 coils with a total turns ratio, which is the same as the total turns ratio of the power transformer winding 56 and 60, the filament voltage will be proportional to the line voltage regardless of the distribution of the line voltage between the reactor 12 and the transformer 44.

For example, assuming that the voltage of the source 14 is 120 volts, that the primary winding 56 has 160 turns, winding 36 has 100 turns, winding 60 has 8 turns, and winding 38 has 5 turns, and that at a particular moment the 120 volts is distributed so that 60 volts appears across the primary coil 56, and 60 volts appears across reactor coil 36, then 3 volts will appear across the secondary coil 60, and 3 volts will appear across reactor coil 38, giving a total of 6 volts. If, at another moment, the 120 volts is distributed so that 40 volts appears across primary coil 56, and 80 volts appears across reactor coil 36, then 2 volts will appear across secondary coil 60, and 4 volts across resistor coil 38, whereby the desired total of 6 volts is still supplied to the filaments of the tube elements 68 and 78.

In a similar manner, the B+ supply (C39) for the anodes of tubes 68 and 78 is maintained substantially constant by providing a total turns ratio for secondary coils 58 and reactor coil 37, which is equal to the turns ratio of primary coils 56 and reactor coil 36.

The first control electrodes 72, 82 of the comparer tubes 68, 78, are connected to the output of the reference voltage stage 22 and the cathodes 76, 86 thereof are connected to one side of the load (C52). The second control electrodes are connected to each other over windings b and c of the tube alarm relay, and in the output circuit of the current limiter circuit 26.

The reference voltage stage comprises a voltage regulator tube 92, which may be of the type OB2, and a voltage divider comprised of resistances 100, 102 and 104. The voltage regulator tube 92 includes a plate 94 which is connected to supply conductor 39 over a resistor member 96, and a cathode 98 which is connected over conductor 54 to the negative side of the load.

The voltage divider means comprising resistors 100, 102 and 104, are connected between the anode 94 and the load supply conductor 54.

A slider arm 106 on resistance 102 is connected to the control electrodes of tubes 68 and 78.

Resistor member 108 is connected between the grid and filament circuits of the tubes 68 and 78 to improve the alternating current regulation in the system as more fully described hereinafter, and a resistor member 110 is connected between the grid circuit for the comparer tubes 68 and 78, and the rectifier bridge 18, to reduce the amplitude and increase the frequency of hunting in the system. Capacitor 112 is connected between the grid circuit for comparer tubes 68 and 78 and supply conductor 52 for the load circuit.

CONTROL CIRCUIT OPERATION

The control circuit, as connected, is extremely sensitive to changes in the value of voltages supplied to the load; and operates immediately to change the flow of current in reactor winding 40, and thereby compensate for the voltage change. A small amount of aid to the more sensitive adjustments effected by the control circuit 20 is provided by the changes in current as detected by the control winding 42.

The operation of the reference voltage stage 22 and comparer stage 24 is set forth in the disclosure of the copending application which was filed by applicant on February 6, 1947, as Serial No. 726,814, and which was assigned to the assignee of this invention. Briefly, the voltage regulator tube 92 is conductive on positive half cycles when the alternating current voltage and battery voltage are in additive relation, and is non-conductive on the negative half cycles when the battery and alternating current voltges are in opposition. During the period of conductivity, a fixed reference voltage is provided by the voltage divider network 100, 102, 104, for the grids of the comparer tubes 68, 78. The comparer tubes 68, 78 are connected to the load circuit, and are operative to compare the load circuit with the reference voltage thus provided, and to adjust the current flow through winding 40 of the reactor a sufficient amount to compensate for any variations of the load voltage which may be detected.

Specifically, with energization of the charger, B+ voltage is supplied by the power transformer 44, over secondary winding 58 and reactor winding 37, conductor 39 and resistor 96 to the anode of voltage regulator tube 92 in series with the load voltage (which in the present example comprises a battery 16 of approximately 52 volts) ammeter 136, and conductor 52 to the other side of the secondary winding 58.

Voltage regulator tube 92 conducts on each positive half cycle (the battery and alternating current voltages being additive at such time), and is nonconductive on negative half cycles, (the battery and alternating current voltages being in opposition at such time). The characteristics of the voltage regulator tube 92 are such that during conduction a substantially constant potential difference of approximately 105 volts is maintained between its anode 94 and cathode 98.

As a result, a substantially constant voltage is impressed across the voltage divider means which is comprised of resistors 100, 102, and 104, and a reference voltage of a substantially constant value with reference to conductor 54 appears at point 140 (Figure 1A). The value of the reference voltage may be altered as desired by varying the setting of the potentiometer arm 106.

The value of the voltage as provided at point 140 is supplied to the control grids 72, 82 of the comparer tubes 68, 78, and the load voltage is continuously compared therewith, and variations of the load from the value desired are detected and compensation is made therefor.

For purposes of simplicity, the operation of tube 78 will be considered alone, it being apparent that comparer tubes 68, 78 are connected in parallel and a like operation of the tubes will therefor be effected. Comparer tubes 68, 78 have a critical grid voltage of approximately —1 volt; i. e., if the grid is less than 1 volt negative, the plate is fully conducting. If the adjustment arm on potentiometer 102 is set to provide a reference voltage at point 140 of approximately 51 volts, the voltage of the load will be held at substantially 52 volts. That is, as the battery load increases above 52 volts, the cathode voltage is similarly increased, whereby the grid is more than one volt negative with respect to cathode, and the tubes 68 and 78 will be rendered nonconductive.

On the other hand, if the battery load voltage falls below 52 volts, the cathode voltage is reduced, and the grid is positive with respect to cathode, whereby the tubes 68 and 78 are rendered conductive. With conduction of comparer tubes 68 and 78, current is extended over control winding 40 of the saturable reactor 12, the complete circuit extending from the secondary winding 58 of transformer 44, reactor winding 37, conductor 39, reactor control winding 40, the tube alarm relay windings $a$ and $d$, comparer tubes 68 and 78, conductor 52 and the other side of the secondary winding 58. Conduction by the control tubes effects added saturation of the reactor 12 to effect adjustment of the voltage value in the manner of a reactor unit. As the supply voltage approaches the preset value, conduction by the comparer tubes 68, 78 is cut off, and the current flow in the control winding is terminated.

Although the voltage regulator tube 92 is an on-off device which is either fully conducting or fully nonconducting, the output of the electronic circuit which energizes the reactor winding 40 provides a smooth and continuous control of the charger output. Briefly, although the reference voltage as applied to the grids 72, 82 of the control tubes 68, 78 cannot control the magnitude of the plate current during any one cycle, the relative number of conducting and nonconducting cycles controls the average plate current. Thus, if the charger load is light, the comparer tubes 68, 78 may be nonconductive for six or eight cycles, conduct subsequently for one or two cycles, and so on. The shorted winding 41 of reactor 12 aids in the provision of a fairly constant saturating flux which is proportional to the average value of the intermittent current.

ALARM CIRCUIT

The plate circuits 70, 80 of comparer tubes 68, 78 are connected to the supply conductor 39 through opposed windings $a$ and $d$ of a tube alarm relay 90 so as to inform the attendant of a tube failure. The tube alarm relay 90 comprises four windings, two of which consist of so-called opposing windings, which are operative as energized to prevent the relay from operating a set of associated alarm contacts 91. As long as both tubes 68, 78 are conducting the opposing windings $a$ and $d$ are energized, and are operative to prevent the alarm relay from operating; if one of the tubes 68, 78 fails, current through the other winding as provided by the conducting one of the tubes causes relay 90 to operate, which contacts 91 are closed, and alarm circuit 93 is energized.

It is well known that the characteristics of tubes, such as 68, 78, will vary in the units as commercially obtained. To preclude an arrangment wherein one tube would conduct responsive to a particular voltage and the other would not, a pair of windings $b$ and $c$ on the tube alarm relay 90 are connected to the secondary control electrodes 74, 84 of the tubes 68, 78 to force the tubes to operate together if both tubes are in an operative condition. Thus, if one tube fires, the current flowing in the plate circuit and through its associated relay winding will induce a voltage in the other winding which is of a polarity which will render the grid of the other tube conductive. The alarm is operated, therefore, only if one of the tubes is to be replaced.

OPERATING CHARACTERISTICS

Figure 2:
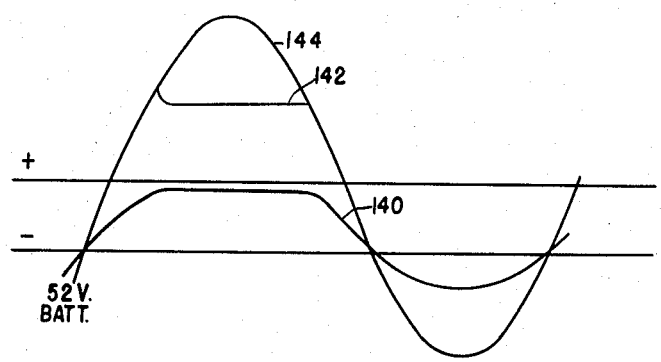

With reference to Figure 2, the numbered curves thereat show the voltages which appear at the correspondingly numbered points in the circuit of Figure 1A. With conduction by the reference tube 92, a voltage illustrated by the flat portion of curve 142 appears at point 142 of Figure 1A, the slight peak at the beginning being the starting voltage which is about 115 volts.

With the resistance values of the circuit shown in Figure 1A, the reference voltage at point 140 is about midway between that at point 142 and negative battery, giving curve 140 in Figure 2. Capacitor 112 absorbs the starting peak of the control tube 92 so that there is no bump at the beginning of the flat portion of curve 140. The voltage drop across tube 92 is substantially constant during conduction. The voltage drop from point 140 to negative battery will also be substantially constant and of a value determined by the setting of the potentiometer arm, this latter voltage being the reference voltage and the standard against which the battery voltage is compared.

Figure 3:
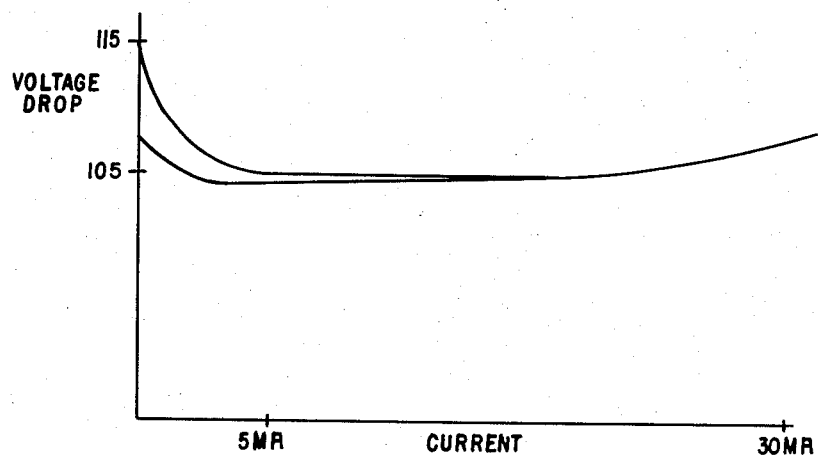

Resistor 108 connected between the filament supply circuit and the input to the grid circuits 72, 82 of comparer tubes 68, 78 improves the A. C. regulation obtained from the voltage reference tube 92. Although the voltage drop across tube 92 is substantially constant (and of a constancy which would be considered sufficient in most control circuits), compensation for the variation experienced (as shown in Figure 3) is desirable in providing a most sensitive type of control arrangement.

As there shown, the drop is in the order of 105 volts at 3 or 4 m. a., and remains constant up to 10 or 15 m. a. of current draw. However, between 15 and 30 m. a. of current draw, the drop across the tube increases several volts. Further, the voltage drop follows a curve with reduction of current conduction by the tube, which is different than the curve followed by the tube responsive to increase of current flow therethrough, the return curve being also shown in Figure 3.

At currents below 5 ma., the voltage drop is erratic, and the curve will contain unpredictable jogs and jumps instead of being smooth as shown. The voltage drop at high currents is consistent among tubes, but the starting voltage and low current drop varies from one tube to the next, and also varies with age of the tube. Whereas plate 94 of tube 92 might be supplied with 10 or 15 ma. current from a D. C. source, the additional equipment for effecting such supply would add considerable expense to the cost of the charger. In the present arrangement, plate 94 of tube 92 is energized by positive alternating current half cycles on supply conductor 39, so that on each cycle the current starts from zero and traverses the entire curve of Figure 3.

The form of the curve taken by the voltage across tube 92, as a result of energization of the tube 92, is shown at 142 (Figure 4), the regions "X" and "Z" of the curve there shown being the unstable low current regions, and the hump at "y" being the voltage rise at high current. Since the peak current depends on the alternating current supply voltage, the rise at "y" will vary with line voltage, and the dips between "x" and "y" and between "y" and "z" are the only really constant portions of the curve.

Figure 4:
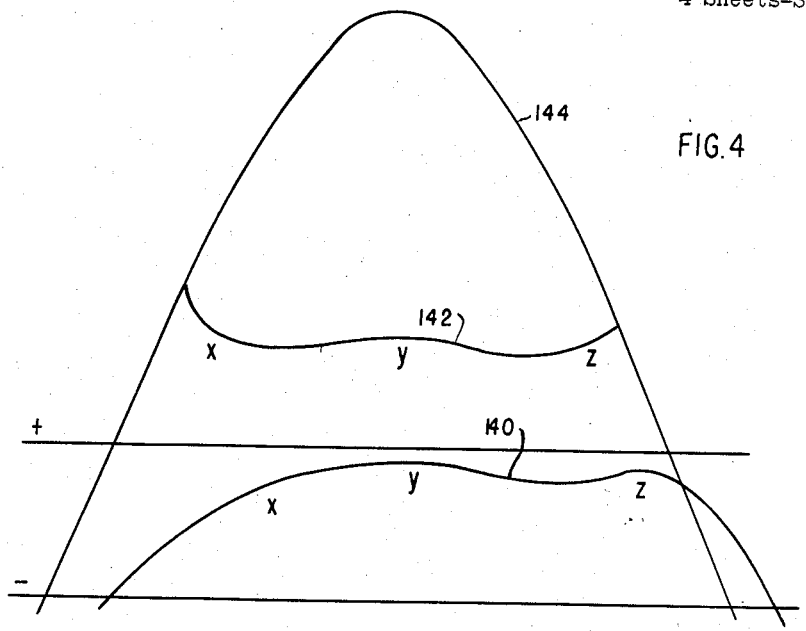

Curve 140 of Figure 4 indicates the pattern of the curve for the voltage at the arm of the adjustable resistance 106 (and at the input to the grids 72 and 82), it being apparent that the curve 140 is similar to curve 142, except that the capacitor 112 connected between the grid input and conductor 52 smooths out the starting peak of tube 92. In that the starting voltage varies greatly among tubes, capacitor 112 must be large enough to absorb the highest peak under which condition region "x" will be rounded off considerably with the average tube, and the entire curve 140 delayed in phase. The hump "z" in curve 140 occurs too late in the cycle to control the thyratrons 68 and 78; hence the hump "y" is the effective reference voltage, and this hump varies with line voltage.

Figure 5:
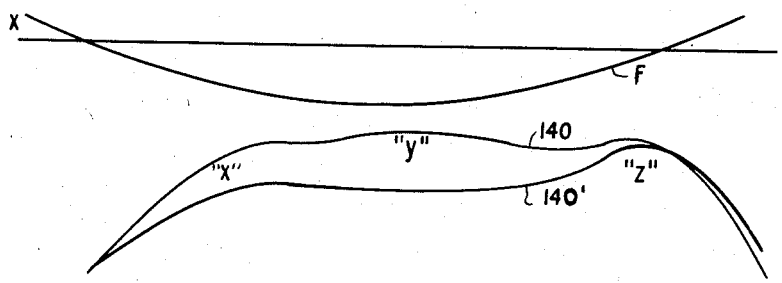

Figure 5 shows the method whereby the addition of the resistor 108 improves the alternating current regulation effected by the control tube 92. Assuming that curve F shown thereat is the pattern of the A. C. voltage, and is added to the normal reference voltage at 140, it is obvious that the resultant curve will take the form of the curve indicated at 140'. As there shown the hump "y" is depressed and the thyratrons 68, 78 will be controlled by a new hump between "x" and "y," this being a stable region in the conduction cycle for the tube 92. If the alternating current line voltage increases, the increase of curve F will cause curve 140' to drop slightly, thereby automatically compensating for the rise in line voltage. The shape of curve 140' also has the advantage of enabling the thyratrons 68, 67 to start conduction earlier in the cycle.

The alternating current voltage pattern illustrated by curve F is obtained in the circuit of Figure 1 from the thyratron filament supply circuit (which is of a constant value by reason of the turns ratio of transformer winding 56, reactor winding 36 and transformer winding 60 and reactor winding 38 heretofore described), and is fed over resistor 108 to the grid circuit 72, 82, whereby the improved type regulation is attained.

It is noted that the secondary windings 60 and 58 are wound in an opposite direction (as are windings 38 and 36), so that when conductor 39 is positive, conductor 35 is negative. It is also noted that curve 140' may be adjusted upwardly toward the positive line by effecting a slight upward adjustment of the slider arm 106. It is apparent from the foregoing discussion that by supplementing the output voltage of the reference tube 92 with a voltage which varies with the A. C. line voltage, automatic compensation of the reference voltage is provided for each change in line voltage.

DAMPING ARRANGEMENT

Whereas the basic structure of the charger is such that a certain amount of hunting is inherent therein, such hunting has no ill effect on either the charger or the battery, and accordingly does not warrant the inclusion of expensive circuitry to eliminate same. A simple method of damping the inherent hunting is illustrated in Figure 1A, wherein a resistor 110 has been connected between one side of the choke 48 and the input to the grid circuits 72, 82 of the comparer tubes 68, 78, the filter choke 48 providing a voltage which is proportional to the rate of change of current supplied to the load. That is, if the current draw for the load is increasing, the left hand end of the choke is negative, and if the load current draw is decreasing, the left hand end of the choke is positive. Accordingly, as the thyratrons 68, 78 conduct, the load charge current starts increasing and the transient negative choke voltage applied to the grids 72, 82 through resistor 110 tends to stop conduction before much variation in the value of current has been effected. In a like manner, as conduction of the tubes 68, 78 is decreased to cut-off, the positive voltage produced by the choke with decreasing current load output tends to reestablish conduction. The general effect is to speed up the hunting and to reduce its amplitude, both of which substantially minimize the hunting effect as evidenced on the ammeter 136.

In addition to the choke voltage produced by the rate of change of average output load current, there is a large ripple voltage caused by the varying current during each cycle. As the wave form and magnitude of ripple both change with load, resistor 110 must be sufficiently large to prevent introduction of any large amounts of ripple into the reference voltage which appears at the grids of the comparer tubes 68 and 78.

The slight negative D. C. potential which appears at the output side of the rectifier bridge may be appropriately compensated for by effecting a slight upward adjustment of slider 106 to increase the value of the reference voltage.

CURRENT LIMITER CIRCUIT

A current limiter circuit 26 is connected across the load supply conductors 52 and 54 to prevent delivery of greater than rated current to the load in the event that the load supply demands an excessive rate. The limiter circuit 26 is basically comprised of an OB2 tube 114 which includes a plate 116 and a cathode 118, and which has the same characteristics as the reference voltage tube 92. An RC circuit 120 comprised of a capacitor 122 and resistance 124 is connected between the plate 116 and supply conductor 52. The plate 116 of the current limiter tube 114 is also connected through the opposed windings b and c of the alarm relay 90 to the secondary control electrodes 74, 84 of comparer tubes 68, 78.

Cathode 118 of the current limiter tube 114 is connected over resistor 126 to the load network for the secondary winding 130 of the load transformer 61. A load network comprised of a fixed resistance 132 and an adjustable resistor 134 is connected across the secondary winding 130 of transformer 61. Capacitor 136 which is also connected across the secondary winding 130 smooths the waveform which appears across the secondary winding.

In operation, as the primary winding 128 of current transformer 61 is energized responsive to energization of the charger supply source, a voltage appears across winding 130 which is approximately proportional to the direct current output of the bridge 18. At full rated output, the secondary voltage is sufficiently high to break down the current limiting tube 114 (which has the same characteristics as reference voltage producing tube 92). In that the battery voltage is added to the voltage of the secondary winding 130 on the positive cycle alone, and is subtracted on the negative half cycles, conduction of tube 114 occurs in only one direction and only on positive half cycles.

With conduction of tube 114, the flow of current therethrough produces a voltage drop across resistance 124 which results in the transmission of a negative impulse to the first control grids 74 and 84 of the control tubes 68, 78 to drive same negative, whereby tubes 68, 78 are nonconductive and the flow of charging current therethrough to the control winding 40 is terminated.

Resistors 132 and 134 connected across secondary 130 provide a load on the transformer secondary winding 130, resistor 134 being adjustable to permit adjustment of the voltage output of the transformer 61, and thereby permit adjustment of the value of the current at which the current limiting tube 114 becomes effective.

Capacitor 136 which is connected across the secondary winding 130, smooths out the distorted wave which would otherwise exist. Although the distorted wave form is not objectional per se, the wave form will change with alternating current line voltage, and the limiting action of the equipment would therefore vary with line voltage if the capacitor were not included.

Capacitor 122, connected across resistor 124, sustains the voltage from one cycle to the next, such apparatus being desirable in that the current limiting tube 114 conducts only at the peak of the voltage wave output of the current transformer secondary.

The value of resistors 124 and 126, and the value of capacitor 122 must be selected to prevent blocking of the circuit. For example, if resistor 126 were of zero value, conduction of tube 114 would permit a high current to flow and charge capacitor 122 to a high voltage. If capacitor 122 and resistor 124 were large, a number of cycles would be required for the charge to leak off capacitor 122 during which time the thyratrons 68, 78 would be nonconducting and the charger output current would drop to a low value. On the other hand, if resistor 126 is large, capacitor 122 cannot assume a large proportional charge during one conducting cycle of tube 114, and if the ratios of capacitor 122 and resistor 124 are not too large, capacitor 122 cannot remain charged for more than one or two cycles. In the latter case, limiting will be smooth in the sense that the output current will remain at a nearly steady value near full load rather than being cut on and off.

Through the provision of this effective current limiting circuit, it is possible to connect two or more chargers in parallel without the need of special precautions, and without requiring the use of two chargers of the same current rating. That is, assuming a first conventional charger delivers 52.0 at no load and 51.9 volts at full load, and that a second conventional charger delivers 51.8 volts at no load and 51.7 volts at full load, it can be seen that the first charger will tend to supply the load. It can also be seen that the flatter the regulation of the chargers, the more accurately must their output voltages be set if they are to share the load equally. With the present effective current limiting circuit however, there is no need for the chargers to share the load equally. If in the above example, the battery load is greater than one charger can handle, the first charger will deliver its full output and be held there by the limiting circuit, and then the battery voltage will drop until the second charger comes into play and furnishes the remainder of the load.

CONCLUSION

There has been set forth hereinbefore a novel and extremely reliable battery charger unit which is completely automatic in its control of the supply of a constant potential to a load source. The novel manner in which a reference voltage is provided for continuous comparison with the load voltage, and the manner in which the results of the comparison are utilized to control the output of a saturable reactor in the adjustment of the potential supplied to the load provides an extremely effective and accurate operating type control arrangement.

The novel current limiting circuit included in the arrangement prevents the charger from delivering greater than rated current if the battery voltage is low and offers increased protection of the load circuit equipment. Provision of the parallelly connected tubes in the control circuit in conjunction with the tube alarm relay provides protection against service interruptions in a comparatively inexpensive manner.

The charger is completely automatic in nature, the attendant having only two settings to adjust. One of these adjustments comprises setting of a voltage potentiometer which sets the reference voltage, and accordingly the value of the output voltage to be provided by the unit. The other of the adjustments comprises setting of the limiting potentiometer to determine the maximum output current which may be provided by the charger.

The new and novel control members which have been added to the previously described unit of my copending application, effects the provision of an extremely sensitive control circuit. Actual embodiments of the novel circuitry of the invention have proven that the output voltage varies less than 1% with 5% to 100% variation in load and with 20% variation of the A. C. supply. The novel charger achieves a definitely improved form of control, and is therefore considered to be a distinct advancement in the art.

Other features and advantages of the invention which are believed to be here are set forth in the following claims.

What is claimed is:

1. An arrangement for controlling the flow of current from a current source of variable voltage to a load circuit comprising, in combination, means for deriving from said variable potential source a fixed reference voltage, means for comparing the voltage of said load circuit with said reference voltage, means for controlling the energization of said load circuit from said current source in accordance with a predetermined relationship between said voltages, and means for impressing upon said reference voltage a compensating alternating current voltage which varies inversely with the line voltage to effect provision of a more constant reference voltage supply to said comparing means.

2. An arrangement as set forth in claim 1 in which said compensating means comprises a transformer having at least a first and a second winding, and a reactor unit having at least a first and a second controlled winding, the turns ratio of the reactor windings being the same as the turns ratio of said transformer windings; means for connecting said reactor and said transformer secondary windings in series, and a resistor member for supplying said output voltage of said secondary windings to said comparing means.

3. An arrangement for controlling the flow of current from a current source of a variable voltage to a load circuit comprising, in combination, means for deriving from said variable potential source a fixed reference voltage, comparing means for comparing the voltage of said load circuit with said reference voltage, means for controlling the energization of said load circuit from said current source in accordance with a predetermined relationship between said voltages, and means connected to supply a voltage proportional to the rate of change of current in the load circuit to said comparing means to increase the speed of hunting of the circuit and to reduce the amplitude thereof.

4. An arrangement for controlling the flow of current from a current source of variable voltage to a load circuit comprising, in combination, means for deriving from said variable potential source a fixed reference voltage, comparing means for comparing the voltage of said load circuit with said reference voltage including electronic tube means having at least a control electrode, means for controlling the energization of said load circuit from said current source in accordance with a predetermined relationship between said voltages, means for supplying a voltage proportional to the rate of change of current of said load to said comparing means comprising a choke coil connected across said comparing means to provide a voltage signal proportional to the rate of change of current in said load supply circuit to said control electrode means, whereby an increase or decrease in the rate of charging current flow immediately influences the conduction of the tube comparing means to thereby increase the frequency of, and decrease the amplitude of hunting.

5. An apparatus for controlling the voltage supply for load circuit from a variable supply source, comprising a power transformer having a primary winding and a first and a second secondary winding; a saturable core reactor having a controlling winding, and a first and a second controlled winding; the turns ratio of said reactor controlled windings being the same as the turns ratio of said transformer primary and second secondary windings, means for connecting the primary winding of said transformer, and the first reactor controlled winding in series relation with said source, means for connecting the first one of said transformer secondary windings to the load circuit, and control means for energizing said reactor to control the current flow to said load in accordance with the value of a particular characteristic of said load, comprising electronic tube members connected to detect variations in said given load characteristic and to control said controlling winding for said reactor member in accordance therewith, and means for connecting the second reactor controlled winding and the second one of said transformer secondary windings in series and to said tube members to supply a substantially fixed value potential thereto.

6. An arrangement for controlling the voltage supply for a load circuit from a variable supply source comprising a power transformer having a primary and secondary winding, a saturable core reactor having at least a controlling winding and a controlled winding, means for connecting said transformer primary winding and said reactor controlled winding in series relation with said source, rectifier means having an input and output circuit, means for connecting the input circuit for said rectifier to said transformer secondary winding means, means for connecting the output circuit for said rectifier to the load circuit, and control means for energizing said reactor to control the current flow through the controlling winding of said reactor comprising electronic tube members, each of which has at least a plate circuit, means for connecting said tubes to detect variations in a given load characteristic and to energize the reactor controlling winding in a corresponding manner, an energizing circuit for said tube members; an auxiliary secondary winding means on said transformer means and an auxiliary reactor controlled winding, the turns ratio of the transformer primary winding and its auxiliary secondary winding being the same as the turns ratio of the first reactor controlled winding and the reactor auxiliary winding, and means for connecting said auxiliary reactor winding and said auxiliary transformer winding in series to provide a voltage supply for said plate members of said electronic means which is independent of changes in the load.

7. An apparatus for controlling the voltage supply for a load circuit from a variable supply source comprising a power transformer having a primary winding and a first, a second, and a third secondary winding, a saturable core reactor having a controlling winding, and a first, a second and a third controlled winding, means for connecting the primary winding of said transformer and the first reactor controlled winding in series relation with said source, means for connecting the first one of said transformer secondary windings to the load circuit, control means for energizing said reactor to control the current flow to said load in accordance with the value of a particular characteristic of said load, comprising electronic tube members connected to detect variations in said given load characteristic and to control said controlling windings for said reactor member in accordance therewith, and means for connecting the second reactor controlled winding and the second one of said transformer secondary windings in series to supply a first constant value potential to said tube members; and means for connecting the third auxiliary reactor winding and the third auxiliary transformer winding in series to supply a second constant value potential for said tubes, the turns ratio of the winding for the first reactor controlled winding and the second reactor controlled winding being the same as the turns ratio for the primary and second secondary transformer winding, and the turns ratio for the first reactor controlled winding and the third reactor controlled winding being the same as the turns ratio of said primary transformer winding and said third transformer secondary winding.

8. An arrangement for controlling the flow of current from a source to a load utilizing a saturable core reactor having at least three windings including means for adjusting the flow of current through one of said windings in accordance with the flow of independent direct current control signals through the other two windings thereon, means for applying said independent control signals respectively to each of said other two windings, transformer means having a primary and a secondary winding for supplying power to the load, and means for connecting said one winding of said reactor to said source in series with said power transformer primary winding to control same in the supply of voltage to said load.

9. An arrangement for controlling the flow of current from a current source of variable voltage to a load circuit comprising, in combination, means for comparing the voltage of said load circuit with a reference voltage and adjusting the value of the voltage with detection of a variation of the voltage from the predetermined value comprising a first and a second electronic tube member having at least an anode, a cathode and a control electrode, means for applying the resultant voltage from the comparison of said reference and load circuit voltages to the control electrodes of said tubes to render said electronic tube members conductive responsive to a predetermined resultant voltage, a four winding relay having two windings wound in opposed relationship, means for connecting the anode paths of said first and second electronic tube members to said first set of opposed windings of said relay, whereby said relay is operative responsive to conduction by either one of said valves alone, and alarm signalling means controllable with operation of said relay.

10. An arrangement for controlling the flow of current from a current source of variable voltage to a load circuit comprising, in combination, means for deriving from said variable potential source a substantially constant reference voltage, means for comparing the voltage of said load circuit with said reference voltage; a first and a second electronic tube member, each of which has at least an anode, a cathode and a first and a second control electrode; means for applying the signal resultant from the comparison of said reference and load circuit voltages to said first control electrodes of said tubes to control said tube members to conduct only on alternate half cycles and only responsive to a predetermined resultant voltage, means controlled by said tube members for controlling the energization of said load circuit from said current source, circuit control means controlled to operate responsive to conduction of either one of said tubes alone, and means associated with said circuit control means connected in inductive relation and to said second control electrode of both of said tubes, whereby upon the firing of one tube the current in the anode path of that tube by induction provides a current to the control electrode of the parallelly connected tube to render same conductive.

11. An arrangement for controlling the flow of current from a current source of variable voltage to a load circuit comprising, in combination, means for comparing the voltage of said load circuit with said reference voltage and adjusting the value of the voltage with detection of a variation of the voltage from the predetermined value, comprising a first and a second electronic tube member having at least an anode, a cathode and a first and a second control electrode, means for applying the signal resulting from the comparison of said reference and load circuit voltages to said first control electrode to render said valve means conducting responsive to provision of a predetermined value of voltage, means controlled by said electronic tube members for controlling the energization of said load circuit from said current source, a four winding relay having two windings wound in opposed relationship, means for connecting the anode paths of said first and second electronic tube members over said first set of opposed windings of said relay to said load controlling means, means for connecting the paths for said second control electrodes over said second set of windings, whereby with firing of one of said tubes the flow of plate current of the fired tube over the connected one of the windings induces the signal in the adjacent winding means to place a firing potential on the second control electrode of the other tube and thereby effect the firing of said other tube.

12. An arrangement for controlling the flow of current from a variable voltage source to a load circuit comprising, in combination, means for deriving from said variable potential source a substantially constant reference voltage, means for comparing the voltage of said load circuit with said reference voltage; a first and a second electronic tube member, each having at least an anode, a cathode and at least a first control electrode, means for applying the resultant voltage from the comparison of said reference and load circuit voltages to the first control electrode of each of said tubes to render same conductive only on alternate half cycles responsive to receipt of a predetermined resultant voltage, means controlled by said tube members for controlling the energization of said load circuit from said current source, and means operative responsive to detection of a current in said load circuit which is greater than a predetermined value for rendering said two tubes nonconductive.

13. An arrangement for controlling the flow of current from a current source of a variable voltage to a load circuit comprising, in combination, means for deriving a fixed reference voltage from said source, means for comparing the voltage of said load circuit with said reference voltage, means for controlling the energization of said load circuit from said current source in accordance with a predetermined relationship between said voltages, and means for limiting the value of current flow from said source from exceeding a predetermined value, said means comprising a current transformer having a primary and a secondary winding, means for connecting the primary winding of said current transformer in series with said supply source to provide said secondary winding continuously with a signal proportional to the current being drawn by said load, a device operative only responsive to application of a predetermined value of voltage thereto, means for connecting said device to the secondary winding of said transformer to be responsive to the current drawn by said load, and means for connecting said device to said control means for said load circuit to limit the flow of current to said load responsive to operation of said device.

14. An arrangement as set forth in claim 13 which includes means for adjusting the value of current at which said current limiter becomes effective, and means for rendering the current limiter operative at said predetermined value independent of variations of line voltage.

15. An arrangement as set forth in claim 10 which includes current limiter circuit comprising means for deriving a voltage proportional to the current supply for said load circuit; a device having a substantially constant voltage drop with current flow therethrough, and a resistor connected in series relation therewith; and means for connecting the output of said device over said inductive means to the second control electrodes of said control tubes, whereby with operation of said device in said current limiter circuit a negative impulse is applied to the second electrode of said controlling tubes to prevent conduction of same and thereby terminate flow of current to said load.

16. An arrangement for controlling the flow of current from a current source of variable voltage to a load circuit comprising in combination a power transformer having primary and secondary windings, a current transformer having primary and secondary windings, a saturable core reactor having controlling and controlled windings, a rectifier, a load supply circuit, means for connecting said power and said current transformer primary windings and said reactor controlled winding means in series relationship with said source, means for connecting the secondary winding of said power transformer means to the input of said rectifier, means for connecting the output of said rectifier to said load supply circuit, means for controlling energization of said reactor controlling winding and said supply circuit for said load according to a characteristic of the load, means for limiting the current flow in said load supply circuit including a device having a substantially constant voltage drop responsive to current flow thereto, a resistor, and means for connecting said resistor, said device and said current transformer secondary winding in series relation across said supply circuit for said load, and circuit means for connecting the output of said current limiting device to said control means so as to limit the output thereof to said load whenever the predetermined current rating is exceeded.

17. An arrangement as set forth in claim 16 in which said means for connecting the output of said power transformer to said rectifier includes a peak limiter circuit of a value which short circuits the third harmonic in the waveform output of the transformer.

18. An apparatus for controlling the voltage supply for a load circuit from a variable supply source comprising reactor means for controlling the current flow to said load, and control means for controlling said reactor means in its current adjusting operation in accordance with the value of particular characteristics of said load, said control means comprising at least one electronic tube member having a pair of control elements and a cathode, a first input circuit coupled between one of said control elements and said cathode, and a second input circuit coupled between the other of said control elements and said cathode, means for deriving from said variable supply source a constant reference voltage, means for comparing the voltage of said load circuit with said reference voltage, means for applying the signal resultant from the comparison of said reference and said load circuit voltages to one of said input circuits to control the conductivity of said electronic tube, voltage responsive means connected to said load circuit for developing a control signal indicative of a current in said load circuit of more than a predetermined value, and means for applying said control signal to the other of said input circuits to render said tube nonconductive in response to the application of said control signal whereby a signal indicative of the voltage and current characteristics of said load is developed to control said reactor means.

References Cited in the file of this patent

UNITED STATES PATENTS

| | | |
|---|---|---|
| 2,450,012 | Master et al. | Sept. 28, 1948 |
| 2,470,556 | Hedstrom et al. | May 17, 1949 |
| 2,511,219 | Pogorzelski | June 13, 1950 |